Sept. 16, 1969     M. L. BENJAMIN ET AL     3,466,681

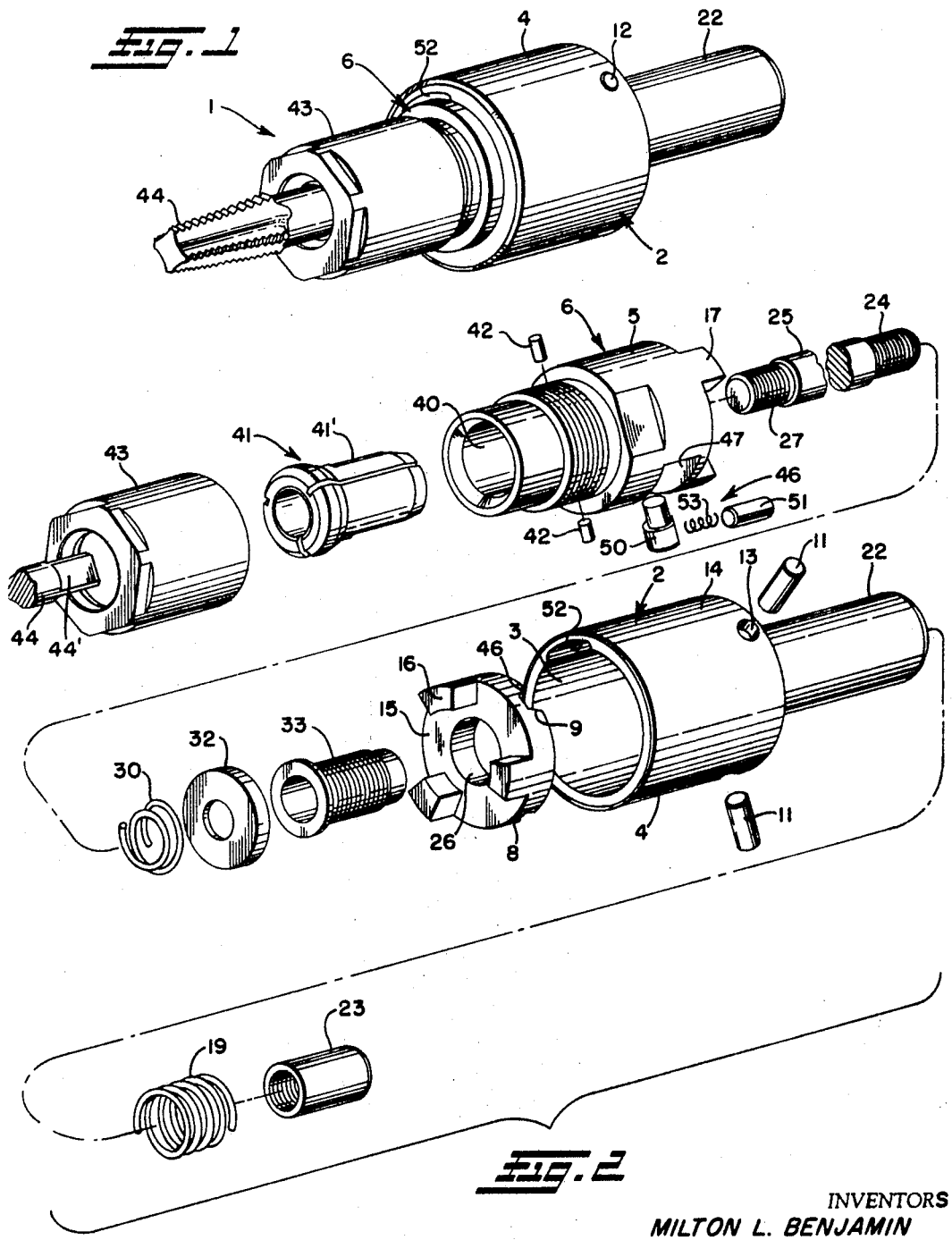

SELF-RELEASING TAP HOLDER

Filed May 4, 1967     2 Sheets-Sheet 2

INVENTORS
MILTON L. BENJAMIN
DAVID D. WALKER

BY *Oberlin, Maky, Donnelly & Renner*
ATTORNEYS

United States Patent Office 3,466,681
Patented Sept. 16, 1969

3,466,681
SELF-RELEASING TAP HOLDER
Milton L. Benjamin and David D. Walker, Chagrin Falls, Ohio, assignors to Erickson Tool Company, Solon, Ohio, a corporation of Ohio
Filed May 4, 1967, Ser. No. 636,039
Int. Cl. B23g 5/16; F16d 11/04, 41/06
U.S. Cl. 10—141                                           14 Claims

ABSTRACT OF THE DISCLOSURE

A self-releasing tap holder having a driver interposed between the housing and holder body for establishing a driving connection therebetween but which is fully disengaged from the holder body upon predetermined axial travel of the holder body away from the housing.

BACKGROUND OF THE INVENTION

The present invention relates generally as indicated to a self-releasing tap holder and more particularly to certain improvements in tap holders especially of the type shown in U.S. Patent No. 3,171,145, granted to Milton L. Benjamin and Frankyln E. Winnen on Mar. 2, 1965, which permit automatic disengagement of the tool holder which supports the thread cutting tool from the driver when the thread has been cut to the prescribed depth and subsequent reengagement of such driver and tool holder for positive backing out of the thread cutting tool when the direction of rotation of the driver is reversed.

The driver and the tool holder of the above-mentioned patent each have driver and driven clutch elements carried thereby whose teeth are yieldably held in axially overlapping driving engagement. The crests of the teeth of the driver and driven clutch elements have corresponding slopes whereby when the tool holder has advanced axially relative to the driver a distance sufficient to permit the adjacent corners of the teeth to clear each other, the teeth will click over each other thereby releasing the tap so that it will no longer thread into the workpiece. At the same time, there is sufficient overlap at the opposite corners of the teeth to cause the tap to unscrew from the workpiece when the direction of rotation of the driver is reversed.

Such a tap holder construction has proven to be quite satisfactory in use, but there is some undesirable wear of the teeth of the clutch elements as they slide over each other when the tap is released and are subsequently engaged when the direction of driver rotation is subsequently reversed to withdraw the tap which will eventually require replacement of the clutch elements at some expense and delay. In any event, because the teeth of the clutch elements slope in the same direction, the clutch elements must be replaced with ones whose teeth slope in the opposite direction when it is desired to cut threads of opposite hand.

SUMMARY OF THE INVENTION

It is accordingly a principal object of the present invention to provide a self-releasing tap holder of the type generally described but which is more simple and less expensive in construction and subject to less wear.

Another object is to provide such a tap holder in which the same driver is used for cutting both righthand and lefthand threads.

A further object is to provide a tap holder of the type described in which normally overlapping teeth on the driver and holder body are positively held out of engagement with each other when the thread cutting tool is released and subsequently positively backed out of the workpiece, thereby completely eliminating wear of the teeth during such periods of operation of the tap holder. These and other objects are achieved by providing a novel pin and groove drive connection between the housing for the tap holder and the driver. The pins engaging the tapered sides of the grooves in the driver cam the driver forward to a slight extent against a stop compressing a spring as torque is transferred from the housing to the tool body through the overlapping teeth on the driver and tool body. However, after the housing reaches the end of its stroke, the thread cutting tool continues to advance a distance sufficient to provide a slight clearance between the crests of the teeth, whereby no additional torque will be transmitted and the spring bias will force the driver rearwardly to maintain a definite clearance between such teeth until the tool is completely backed out of the workpiece by one-way clutch mechanism or the like which operates only when the direction of rotation of the housing is reversed.

Other objects and advantages of the present invention will become apparent as the following description proceeds.

To the accomplishment of the foregoing and related ends, the invention, then, comprises the features hereinafter fully described and particularly pointed out in the claims, the following description and annexed drawing setting forth in detail a certain illustrative embodiment of the invention, this being indicative, however, of but one of the various ways in which the principles of the invention may be employed.

BRIEF DESCRIPTION OF THE DRAWING

In such annexed drawing:

FIG. 1 is an isometric view of a preferred form of tap holder constructed in accordance with this invention showing a tap or other such thread cutting tool mounted in position;

FIG. 2 is an exploded isometric view of the tap holder of FIG. 1 showing the parts in disassembled form;

DESCRIPTION OF THE PREFERRED EMBODIMENT

Figure 3:
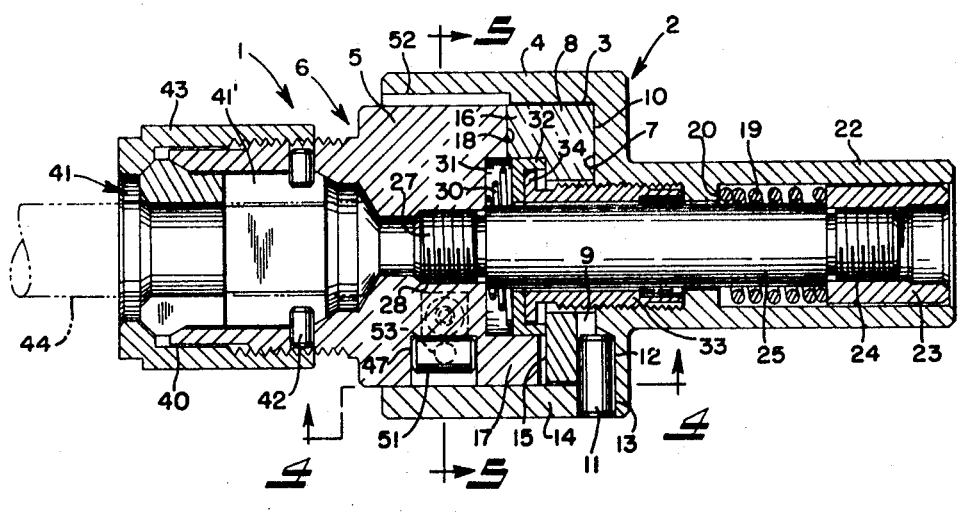
FIG. 3 is a longitudinal section through the tap holder of FIG. 1.
Figure 4:
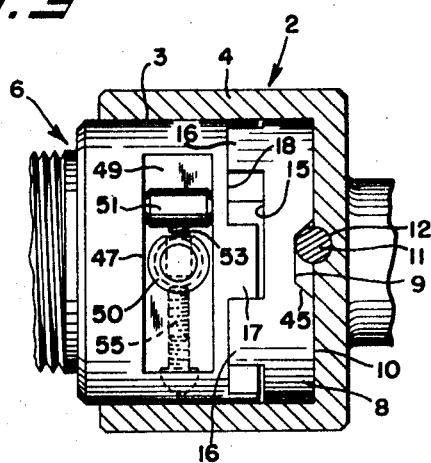
FIG. 4 is a fragmentary bottom plan view of such tap holder with the housing partially broken away to show the driving connection between the housing and driver and between the driver and holder body.
Figure 5:
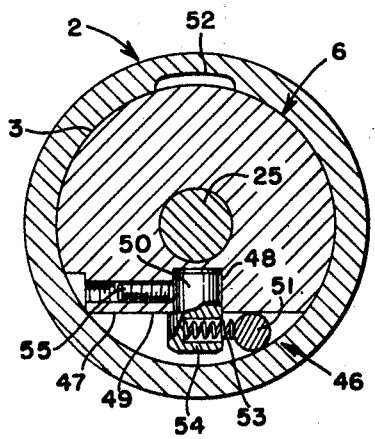
FIG. 5 is a transverse vertical section through the tap holder of FIG. 3 taken on the plane of the line 3—3 thereof to show the details of the one-way clutch mechanism.

Turning now in detail to the drawing and first especially to FIGS. 1–3, there is shown by way of example a tap or similar type tool holder 1 which in accordance with this invention consists of a housing 2 having a socket or counterbore 3 in the outer end 4 for receipt of the inner end 5 of a holder body 6. Also received in the counterbore 3 interposed between the bottom wall 7 of the counterbore and the holder body 6 is a cylindrical driver 8 having a plurality of circumferentially spaced radial grooves 9 in the inner face 10 thereof which are engaged by similarly spaced radial pins 11 lying in recesses 12 in the bottom wall 7 and held in position by their outer ends extending into radial apertures 13 in the cylindrical wall 14 of the counterbore 3. The outer face 15 of the driver 8 has circumferentially spaced teeth 16 projecting therefrom which are adapted to overlap teeth 17 on the inner face 18 of the holder body 6 for establishing driving engagement between the housing 2 and holder body 6 through the driver 8. As shown, there are three grooves 9 in the driver 8 spaced equidistance apart and three such teeth 16, 17 on the driver 8 and holder body 6, respectively, with the grooves 9 intermediate the teeth 16. However, it should be understood that a greater or lesser number of grooves 9 or teeth 16, 17 could be provided if desired.

The holder body 6 is urged axially inwardly to establish such overlapping driving engagement between the teeth 16, 17 on the driver 8 and holder body 6 by a compression spring 19 confined between an internal shoulder 20 in the bore 21 of the housing shank or spindle 22 and a sleeve 23 having threaded engagement with a reduced end portion 24 of a stud 25 contained in the bore 21. The stud 25 extends through a central opening 26 in the driver 8 and has its other reduced end portion 27 in threaded engagement with a central bore 28 in the holder body 6. A lighter spring 30 disposed in a recess 31 in the inner face 18 of the holder body 6 surrounding the stud 25 urges a cup-shaped spacer element 32 against the outer face of the driver 8 for biasing the driver toward the bottom wall 7 of the housing 2, and a sleeve 33 in threaded engagement with the wall of the bore 21 has an outturned flange 34 which limits the extent of forward movement of the driver 8 against such spring bias for a purpose to be fully explained hereafter.

The outer end of the holder body 6 may have a socket 40 therein for reception of a chucking device 41 of suitable type which may be retained against rotation in the socket 40 by pins 42 received in a slot 41' in the inner end of the chucking device. A nosepiece 43 having threaded engagement with the holder body 6 when tightened causes the chucking device 41 to be radially contracted in known manner into tight gripping engagement with the shank of a tap 44 or other such thread cutting tool, and flats 44' on the inner end of the tap nonrotatably fit into the slot 41'.

In operation, the spindle 22 is suitably connected to a drilling or tapping machine and the tool holder 1 and a workpiece, not shown, are moved relative to each other to bring the tap 44 into a bore to be internally threaded. The housing 2 may now be driven in either direction depending on whether a right or a left hand thread cutting tap 44 is being used, and the driver 8 will transfer torque from the housing 2 to the holder body 6 for rotating the tap. As the tap rotates, it cuts a thread in the hole and pulls itself into the workpiece while the housing 2 is correspondingly advanced by the feed of the machine to maintain overlapping driving engagement between the teeth 16, 17 and the radial pins 11 and driver grooves 9.

As the tap 44 nears the desired depth of thread to be cut, the movement of the housing 2 is intentionally interrupted by a stop or the like, not shown, but since the housing 2 is still rotating, the tap 44 will continue to advance relative to the housing 2 until there is zero overlap between the teeth 16, 17 which occurs when the desired thread depth has been reached. The side walls 45 of the driver grooves 9 may be tapered approximately 40° whereby during such relative movement of the holder body 6 away from the housing 2, the radial pins 11 which engage one or the other of the tapered side walls 45 will cam the driver 8 forward to a slight extent against the bias of spring 30 but not sufficient to disengage the pins 11 from the grooves 9 because of the sleeve 33 which limits such forward movement of the driver 8 to a distance less than the maximum overlap between such pins and grooves. As an example, the maximum overlap between the pins 9 and grooves 11 may be ⅛" and the maximum clearance between the flange 34 and driver 8 may be ¹⁄₁₆", permitting a ¹⁄₁₆" maximum forward movement of the driver 8. Accordingly, when zero overlap between the teeth 16, 17 is established, and no further torque is transmitted therebetween, the spring 30 will force the driver back against the bottom wall 7 to provide a ¹⁄₁₆" clearance between the crests of the teeth 16, 17 thus eliminating any chance of sliding contact of such teeth over each other as the housing 2 and driver 8 continue to rotate with respect to the holder body 6 for increased teeth life. If the maximum overlap between the teeth 16, 17 is ¼", such disengagement will occur after the holder body 6 axially advances ⁵⁄₁₆" with respect to the housing 2.

A one-way clutch mechanism 46 is provided for backing the tap 44 out of the hole when there is zero overlap between the teeth 16, 17 simply by reversing the direction of rotation of the housing 2. The clutch mechanism 46 may be conventional type, but preferably consists of a transverse groove 47 in the outer periphery of the holder body 6 having a central recess 48 in the bottom 49 thereof for receipt of a radial pin 50 which does not project outwardly beyond the holder body 6. A roller 51 whose axis is parallel to the axis of the tool holder 1 is disposed in rolling contact with the bottom of the groove 47 on one or the other side of the pin 50 depending on which direction of rotation the clutch mechanism is to be operative for use with either right or left hand threading taps. A recess 52 in the wall of the counterbore 3 cooperates with the groove 47 containing the roller 51 to lock the roller therebetween to effect unscrewing of the tap when the housing 2 is turned in the appropriate direction. A spring 53 contained in a recess 54 in the pin 50 urges the roller 51 into engagement with the wall of the counterbore 3. A set screw 55 may be used to secure the pin 50 in the desired adjusted position.

The groove 47 in the holder body 6 and recess 52 in the housing 2 are preferably located in such manner that when the roller 51 engages the recess 52 for the withdrawing of the tap, the teeth 16, 17 on the driver 8 and holder body 6 are out of alignment with each other so that when the tap is disengaged from the workpiece and the holder body 6 is moved toward the housing 2 by the spring 19, the teeth 16, 17 will be brought into overlapping engagement ready for transmitting torque for the next threading operation. This may be accomplished by locating the groove 47 in the holder body 6 intermediate two of the teeth 17 and locating the recess 52 in the housing 2 intermediate two of the radial pins 11.

Although it is preferred that the pin and groove connection be provided between the housing and driver and that the teeth connection be between the driver and holder body, the connections could be reversed if desired without departing from the present invention.

We claim:

1. A self-releasing tool holder comprising a housing, a holder body, a driver interposed between said housing and holder body, first and second clutch means which when interengaged establish a driving connection between said housing and driver and between said driver and holder body, respectively, and spring means for yieldably urging said holder body toward said housing to establish such interengagement of said first and second clutch means, said first clutch means including a radial groove in one of the adjacent faces of said housing and driver and a radial pin projecting from the other face for receipt in said radial groove, additional spring means for biasing said driver toward said housing, said groove having tapered side walls which are adapted to be engaged by said pin during rotation of said housing for transmitting normal torque loads between said housing and driver during which said driver is cammed away from said housing against the bias of said additional spring means a distance less than the overlap between said pin and groove, said second clutch means comprising circumferentially spaced teeth on the adjacent faces of said driver and holder body which are adapted to be disengaged upon predetermined axial travel of said holder body away from said housing and driver, said additional spring means being adapted to urge said driver toward said housing and away from said holder body when such disengagement of said teeth occurs to provide sufficient clearance between the crests of said teeth on said driver and body to preclude any sliding contact therebetween.

2. The tool holder of claim 1 further comprising an additional clutch mechanism for establishing a drive connection between said holder body and housing when the direction of rotation of said housing is reversed and said teeth on said driver and body are disengaged as aforesaid.

3. The tool holder of claim 1 wherein said first clutch means consists of a plurality of said circumferentially spaced pin and groove connections between said housing and driver.

4. The tool holder of claim 1 further comprising means for limiting such movement of said driver away from said housing to a distance less than the maximum overlap between said pin and groove to preclude disengagement of said pin from said groove.

5. The tool holder of a claim 2 wherein said additional clutch mechanism comprises a transverse groove in the outer periphery of said holder body, a central recess in the bottom of said transverse groove, another radial pin projecting from said central recess into said groove, a roller having its axis parallel to the axis of said tool holder disposed in rolling contact with the bottom of said groove on one or the other side of said another radial pin depending on which direction of rotation said additional clutch mechanism is to be operative, and a recess in said housing which cooperates with said transverse groove in said holder body for locking said roller therebetween to establish such drive connection between said holder body and housing when the direction of rotation of said housing is reversed and said teeth are disengaged as aforesaid.

6. The tool holder of claim 5 further comprising a spring in a recess in said another radial pin for urging said roller away from said another radial pin, and a set screw in said holder body for securing said another radial pin in adjusted position.

7. A self-releasing tap holder comprising a housing having a socket in one end, a holder body having one end received in said socket, a driver in said socket interposed between the bottom wall of said socket and an adjacent face on said holder body, radial grooves in the inner face of said driver, radial pins carried by the bottom wall of said socket for receipt in said radial grooves to provide a driving connection between said housing and driver, circumferentially spaced teeth on the adjacent faces of said driver and holder body adapted to be brought into overlapping engagement for establishing a driving connection between said driver and holder body, first spring means for yieldably maintaining such driving connections between said housing and driver and driver and holder body, respectively, and additional spring means for biasing said driver toward said housing, the sides of said grooves being tapered to permit camming of said driver away from said housing by said pins for reducing the amount of overlap between said pins and grooves, whereby when said teeth on said driver and holder body are disengaged upon predetermined axial travel of said holder body away from said housing, said additional spring means will return said driver to its original position and thereby increase the clearance between the crests of said teeth.

8. The tap holder of claim 7 wherein the side walls of said groove are tapered approximately 40°.

9. The tap holder of claim 7 further comprising a longitudinal bore in said housing communicating with said socket, an internal shoulder in said bore between the ends thereof, a stud projecting from said holder body into said bore beyond said shoulder, and a sleeve threaded onto the end of said stud beyond said shoulder, said first spring means being confined in said bore between said shoulder and sleeve.

10. The tap holder of claim 7 further comprising a cup-shaped spacer element received in a recess in the inner face of said holder body, said additional spring means being disposed between said spacer element and the bottom of said recess for urging said spacer element against the outer face of said driver radially inwardly of said teeth thereon.

11. The tap holder of claim 10 further comprising an axially adjustable sleeve projecting from the bottom wall of said socket in said housing having an outturned flange which limits the extent of forward movement of said driver away from said housing to a distance less than the maximum overlap between said pins and grooves.

12. The tap holder of claim 7 wherein said radial pins are contained in recesses in the bottom of said socket, and the outer end of said pins extend into radial openings in said housing for retaining said pins in said recesses.

13. The tap holder of claim 7 further comprising a one-way clutch mechanism for establishing a positive drive between said housing and holder body when the direction of rotation of said housing is reversed to withdraw said tap holder from a threaded hole or the line, said clutch mechanism comprising a transverse groove in the outer periphery of said holder body, a central recess in the bottom of said transverse groove, another radial pin projecting from said central recess into said transverse groove, a roller having its axis parallel to the axis of said tool holder disposed in rolling contact with the bottom of said groove on one or the other side of said another radial pin depending on which direction of rotation said additional clutch mechanism is to be operative, and a recess in said housing which cooperates with said transverse groove in said holder body for locking said roller therebetween to establish such drive connection between said holder body and housing when the direction of rotation of said housing is reversed and said teeth are disengaged as aforesaid.

14. The tap holder of claim 13 further comprising a spring in a recess in said another radial pin for urging said roller away from said another radial pin, and a set screw in said holder body for securing said another radial pin in adjusted position.

References Cited
UNITED STATES PATENTS

| | | | |
|---|---|---|---|
| 1,740,887 | 12/1929 | Crosby | 10—89 |
| 2,069,558 | 2/1937 | Rauen et al. | 192—45 |
| 2,206,047 | 7/1940 | Poorman | 10—89 |
| 2,333,868 | 11/1943 | Kyln | 10—89 |
| 2,356,669 | 8/1944 | Hook | 10—89 |
| 2,432,443 | 12/1947 | Ranney | 10—89 |
| 2,434,075 | 1/1948 | Kelley | 10—89 |
| 2,505,030 | 4/1950 | Cote | 10—129 |
| 2,591,291 | 4/1952 | Raymond | 10—129 |
| 2,664,183 | 12/1953 | Payne | 192—45 |
| 2,723,406 | 11/1955 | Angst | 10—129 |
| 2,858,553 | 11/1958 | Bearhalter | 10—129 |
| 3,117,329 | 1/1964 | Raymond | 10—129 |
| 3,171,145 | 3/1965 | Benjamin et al. | 10—129 |

CHARLES W. LANHAM, Primary Examiner

E. M. COMBS, Assistant Examiner

U.S. Cl. X.R.
10—129; 192—45